US006696141B2

(12) United States Patent
Lolley et al.

(10) Patent No.: US 6,696,141 B2
(45) Date of Patent: Feb. 24, 2004

(54) THROUGH-WALL COPPER FLASHINGS

(76) Inventors: Richard A. Lolley, 142 Westview Dr., Sanford, ME (US) 04073; Kevin D. Broad, 16 Old Post La., Sanford, ME (US) 04073

(*) Notice: Subject to any disclaimer, the term of this patent is extended or adjusted under 35 U.S.C. 154(b) by 50 days.

(21) Appl. No.: 09/788,830

(22) Filed: Feb. 20, 2001

(65) Prior Publication Data

US 2002/0115367 A1 Aug. 22, 2002

(51) Int. Cl.$^7$ .................. B32B 5/12; B32B 15/00; B32B 17/02; B32B 9/06
(52) U.S. Cl. .................. 428/212; 428/109; 428/432; 428/433; 428/457
(58) Field of Search .................. 428/212, 195, 428/450, 432, 433, 209; 264/25

(56) References Cited

U.S. PATENT DOCUMENTS

| | | | | |
|---|---|---|---|---|
| 3,984,598 A | * | 10/1976 | Sarazin et al. | 428/336 |
| 4,803,022 A | * | 2/1989 | Barrell et al. | 264/25 |
| 5,863,845 A | * | 1/1999 | Owen | 442/101 |
| 5,899,026 A | * | 5/1999 | Williams et al. | 52/58 |

* cited by examiner

Primary Examiner—Cynthia H. Kelly
Assistant Examiner—J. Ferguson
(74) Attorney, Agent, or Firm—William F. Hamrock, PA

(57) ABSTRACT

The invention relates to moisture resistant, through-wall, multicomponent copper flashing material and a continuous process for its preparation. Copper sheeting substrate having special properties is laminated on at least one side with fiberglass sheeting having special properties. The fiberglass sheeting is bonded thereto by means of a thin coating of waterbased adhesive, preferably water based polyvinyl emulsion or vinyl acetate emulsion adhesives. A continuous process provides the copper sheeting from a bulk roll to be simultaneously spray coated on both sides with liquid water based adhesive, forcefully engaging and laminating each side with the fiberglass sheeting, air drying and curing the thinly coated adhesive laminated fiberglass sheeting bonded to the copper sheeting. The final multilaminated flashing material has excellent mechanical properties and chemical resistance.

5 Claims, 4 Drawing Sheets

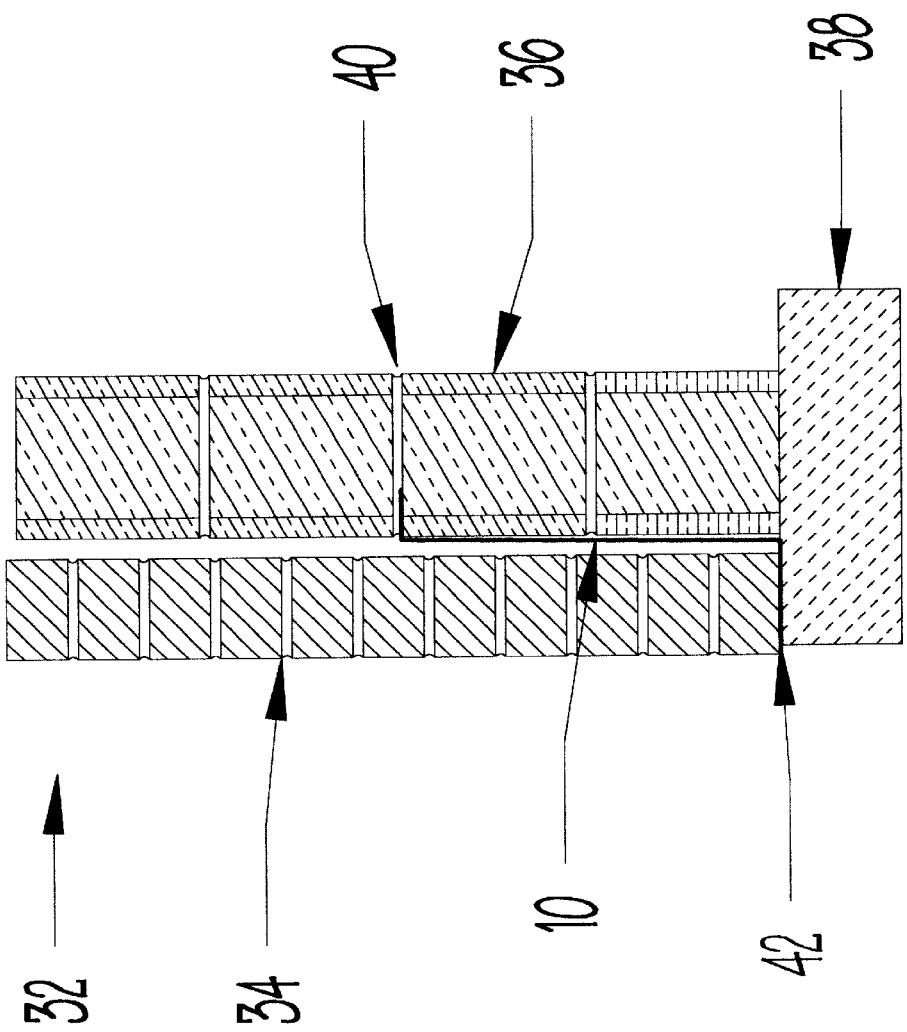

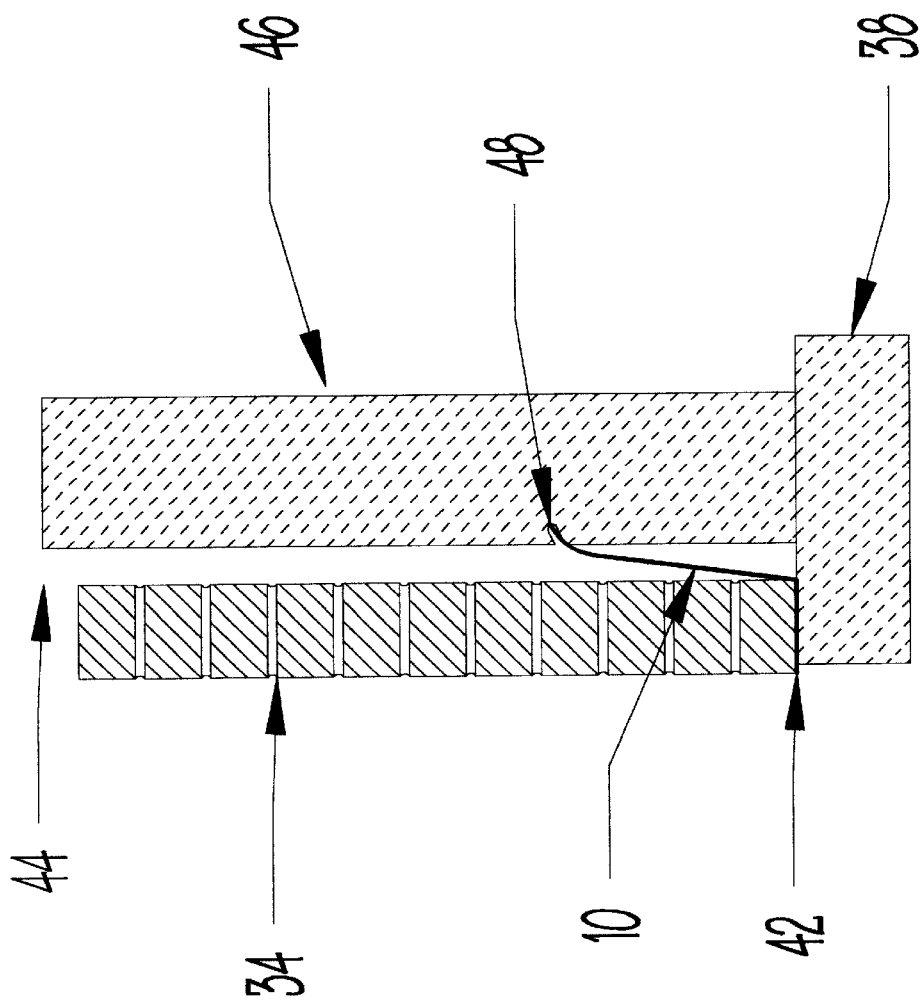

THROUGH-WALL COPPER FLASHINGS

BACKGROUND OF THE INVENTION

The invention relates to moisture protection materials and, in particular, to a multicomponent through-wall flashing material containing copper sheet substrate laminated with fiberglass and waterbased adhesives.

Through wall flashing defines a membrane used in the construction of a masonary wall for the purpose of collecting any infiltrating moisture and directing that moisture out of the wall rather than the moisture progressing further into the wall interior of the building causing costly damage. Moistureproofing materials containing copper as a substrate are well known for use as through-wall flashings to permanently protect structures commonly found in the construction industry from unwanted water penetration. Copper is a desirable membrane material for through-wall applications because of its high degree of resistance to deterioration in the corrosive moist and alkaline atmosphere generally found in construction using motar such as unit masonary where there is a need for protection. Copper also has the desired properties of high tensile strength and good puncture resistance needed to withstand high compressive loads in through-wall applications.

Previously, in conventional laminated through-wall flashings used to control moisture in structures, copper sheeting was laminated with asphalt, fabric, paper, elastomeric liquid materials in liquid or solid form such as urethanes, silicone, siloxanes and silanes. However, there are problems associated with some of these laminations. Asphalt is difficult to work with since it must be applied to the substrate at a very high temperature of about 400 degrees F. and it results in a heavy coating which becomes stiff and rigid and not flexible at low temperatures. The excessive thickness causes installation difficulties where a normal thin motar joint is required. Further, asphalt, fabric and paper are capable of burning and in some cases the fumes can cause injury. Also, some of these flashings cause problems by being susceptible to mildew and rotting. Additionally, the conventional through-wall flashings with exposed asphalt surfaces are generally incompatible with sealant materials generally used to prevent moisture penetration at the termination of the flashing.

In conventional laminated through-wall flashings, the copper sheeting thicknesses generally are between one ounce and seven ounces per squre foot. This relatively light weight copper has been successfully used. However, the lighter the copper sheeting, the more it must be protected by thicker and heavier lamination in order to protect it from puncture, abrasion, and scuffing at the time of installation.

There is a need for an improved laminated light weight copper flashing having excellent moistureproofing properties which overcome the deficiencies of prior art copper flashings.

SUMMARY OF THE INVENTION

In accordance with the the present invention, it has been found that many of the advantages of the prior art copper flashings have been obtained and many of the deficiencies eliminated by utilizing multicomponent copper flashings laminated on at least one side with fiberglass sheeting and waterbased adhesives. The weight of copper sheeting used can be one to ten ounces per square foot preferably of two, three, five and seven ounces per square foot, to provide a lightweight, durable copper flashing bonded with the textured glass fabric and the waterbased adhesive layer as required.

The fiberglass sheeting is made with glass fabric which is stronger and more resistant to the elements than prior art products incorporating cotton fabric. The fiberglass cloth is used for added strength for puncture and tear resistance. Also, the rough exposed fiberglass cloth texture provides a tooth for increased bond with the motar used in brick construction and bonds mechanically making a stronger, more stable wall.

The preferred water based adhesives used are water based polyvinyl emulsion or ethylene vinyl acetate emulsion adhesives. Using these water based adhesives in the laminated flashings provides improvements over the prior art both in the manufacturing process and in the laminated flashing products. One significant improvement as opposed to the prior art is, that since the adhesive is liquid at room temperature, it simplifies the manufacturing process by being able to be applied by a number of procedures, such as, by spraying, roll contact coating, immersion coating or being applied by brushing. A preferred application is by being able to spray a thin emulsion coating of the of the waterbased adhesive on the fiberglass sheeting and thereby securely bonding the fiberglass sheeting to the copper sheeting substrate and protecting the entire flashing by means of this thin adhesive coating. A further significant improvement is, that after application, the adhesive coated flashing can be dried and cured quickly at room temperature with or without added energy input, such as, fans, heating, cooling, etc., as opposed to prior art high temperature processes or other energy assisted techniques. Another significant improvement is that the quantity of the water based adhesive coating for good quality laminations between the metal foil and the fiberglass is at least eighty percent less than prior art asphalt coatings and far less thickness of the adhesive coating than other adhesives being used such as foam layer adhesives. Further, the present water based adhesives are non-toxic both in the liquid/uncured state and in the dry/cured state. Additionally, the present water based adhesive can be cleaned with water as opposed to use of harmful solvents for other prior art materials. Also, the present flashings can be provided in bulk rolls and subsequently rerolled and split in width as required. The thickness of the adhesive coatings on the prepared flashings are thinner and more flexible. Because of the thinner coating and the elasticity the present flashings are more flexible and workable at very low temperatures. This makes it easier to install under a wide variety of atmospheric conditions. The adhesive coating remains flexible, workable and will not delaminate at any temperature likely to be encountered during the construction of a building from about minus twenty degrees F. to about one hundred and fifty degrees F. as opposed to many previous adhesive coatings which become brittle at lower temperatures.

BRIEF DESCRIPTION OF THE DRAWINGS

For further understanding of the features and objects of the invention, reference is made to the following detailed description taken together with the following drawings:

FIG. 3 is a side view illustration of the present through-wall flashing applied within a brick wall and block wall having about a one inch cavity.

FIG. 4 is a side view illustration of the present through-wall flashing applied within a brick wall and concrete wall having about a two inch cavity.

DESCRIPTION OF THE PREFERRED EMBODIMENT

The present multicomponent flashing material for cavity wall construction of the invention has a substrate layer of copper sheeting with fiberglass sheeting adhered thereto by means of water based adhesives. The copper sheeting weighs between one and ten ounces per square foot and has good chemical resistance to water, acids and alkalis which are commonly found in motar, concrete and brick building materials prevalent in cavity wall construction. The copper substrate sheeting also has good mechanical properties of tensile and compressive strength and good resistance to puncture and tearing. The fiberglass sheeting secured to the copper sheeting provides added chemical and mechanical properties with increased puncture and tear resistace and increased bonding to the cavity wall construction, making a stronger more stable wall. The water based adhesive bonding the fiberglass and copper sheetings provides benefits in the manufacturing process and in the finished products unobtainable with prior art through wall copper flashings. Among the improved adhesive properties, as discussed previously, is that the present adhesive coated flashings are completely compatible with all current commercial caulks and sealants used in sealing joints at expansion points, around windows, doors and flashing termination points in the wall and thus do not require additional protection. Some current adhesive coated flashings are incompatible with these commercial caulks and sealants requiring additional protection to provide barriers against the caulks and sealants.

Figure 1:
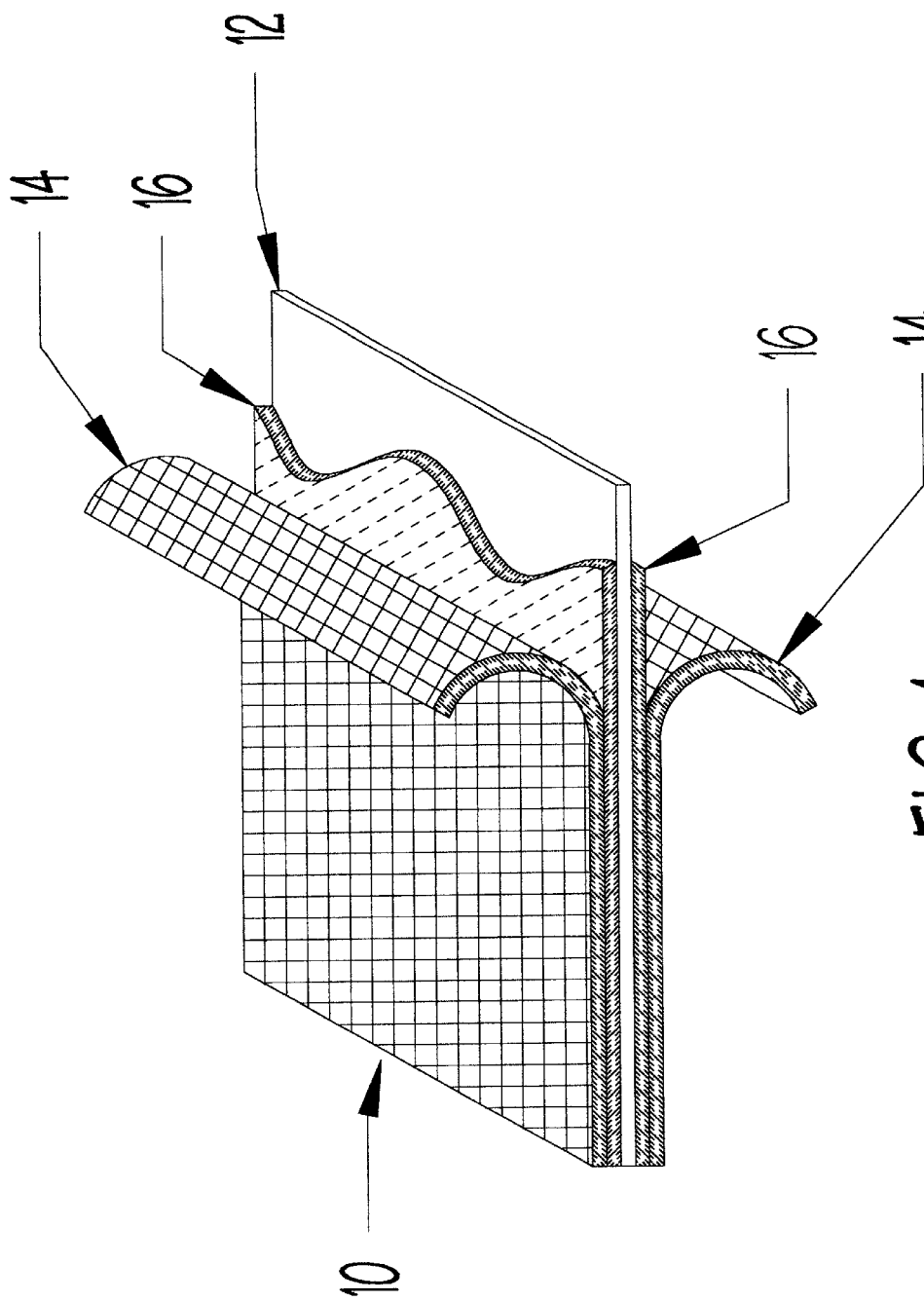
FIG. 1 is an illustration of a preferred moisture proofing through-wall flashing embodiment of the invention, partially broken away to more clearly illustrate the components of the flashing.

A preferred embodiment of the flashing material is depicted in the partially broken away illustration in FIG. 1. Shown is flashing material 10 constructed in accordance with the present invention with lightweight durable copper sheeting substrate 12 preferably about two, three, five or seven ounces per square foot having a thickness of between three and nine thousandths of an inch. Bonded to the copper sheeting substrate is fiberglass sheeting 14 made from strong and resistant glass fabric having a rough surface with good puncture and tear resistance. Preferably, either ten by twenty or twenty by twenty weave fiberglass sheeting having a thickness of about seven thousandths of an inch. The fiberglass sheeting is bonded to the copper sheeting substrate by means of water based adhesives 16 preferably water based polyvinyl emulsion or ethylene vinyl acetate emulsion. The thickness of the adhesive is about one and one half to five thousandths of an inch, preferably about one and one half to three thousandths of an inch.

Figure 2:
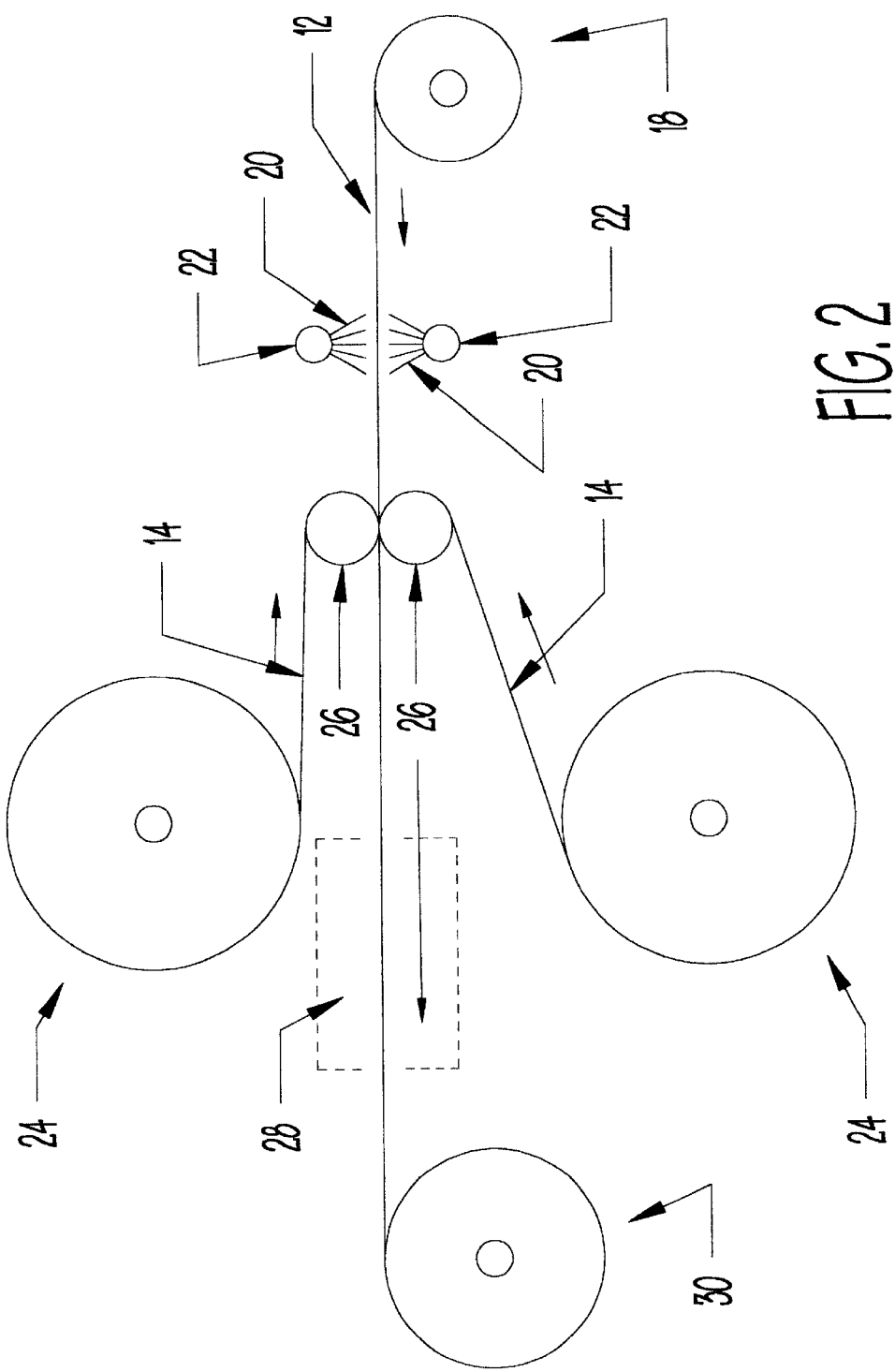
FIG. 2 is a schematic view of a method of processing the flashing sheet, adhesive spray and glass fabric into finished bulk rolls.

A preferred method of manufacturing flashing material 10 of the invention is depicted in FIG. 2. Shown is bulk roll 18 of copper sheeting substrate 12 from which a copper sheet substrate 12 passes through water based adhesive spray 20 from opposing adhesive spray units 22 simultaneously coating both sides of the copper sheeting substrate. Next, fiberglass sheeting 14 from opposing glass fabric bulk rolls 24 pass around opposing pinch-laminating rolls 26 to forcefully engage the fiberglass sheeting within the wet adhesive coated copper sheeting substrate and uniformly level the thickness of the adhesive coating. The wet, uniformly adhesive coated flashing material then passes through an air drying/curing system 28 from which it is rolled onto finish bulk roll 30.

FIG. 3 is a sectional view depicting a building structure illustrating an important improvement of the present invention on how the present thin multilayer laminate flashing provides insertion in normal thin motar joints with ample accommodation for adequate motar, and wherein the largely exposed fiberglass sheeting mechanically bonds with the mortar, and the improved flexibilty of the laminated flashing permits it to be bent at sharp angles. Shown is one inch cavity structure 32 having an upstanding front brick wall 34 and back block wall 36 supported on a horizontal concrete support 38 wherein about a one inch cavity exists between the front and back walls. The thin multilayer flashing material 10 of the invention is shown mounted and bonded within the thin motar joint 40 of the back wall and extends downwardly in the cavity thereby protecting that portion of the back wall from penetration of moisture. Flashing material 10 exits at front joint 42 at base of the front wall on the concrete support permitting the trapped moisture to flow to the outside.

FIG. 4 like FIG. 3 is a sectional view of a building structure. FIG. 4 further illustrates how the present thin multilayer laminate flashing having the glass fabric exposed rough texture bonds mechanically with the concrete wall structure, as well as, a further illustration of the flexibility of the laminated flashing permiting it to be bent at sharp angles. The two inch cavity structure 44 has the upstanding front brick wall 34 and back concrete wall 46 supported on the horizontal concrete support 38 wherein about a two inch cavity is between the front and back walls. The thin multilayer flashing material 10 of the invention in FIG. 4 is shown secured in regret 48 of back concrete wall 46 by means of fiberglass sheeting which is largely exposed providing a rough texture to bond mechanically within the regret. The flashing material extends downwardly within the two inch cavity and exits at the front joint 42 permitting the trapped moisture to be released to the outside of the structure.

New and useful through wall copper flashings having been described, all such foreseeable modifications, adaptations, substitutions of equivalents, mathematical possibilities of combination of parts, pluralities of parts, applications of forms thereof as described by the following claims and not precluded by prior art are included in the invention.

What is claimed is:

1. A moisture resistant, through wall, multicomponent flashing material comprising:
   a copper sheeting substrate having top and bottom sides,
   a fiberglass sheeting about seven thousanths of an inch in thickness laminated on each of the sides of the copper sheeting providing exposed external fiberglass sheetings having rough surfaces, and
   water based polyvinyl emulsion adhesive or ethylene vinyl acetate emulsion adhesive about one and one half to about five thousanths of an inch in thickness bonding the fiberglass sheetings to the copper sheeting.

2. The flashing material according to claim 1 wherein the water based adhesive is one and one half to three thousandths of an inch in thickness.

3. The flashing material according to claim 2 wherein the fiberglass sheeting is about ten by twenty or twenty by twenty weave.

4. The flashing material according to claim 3 wherein the copper sheeting substrate is about one to about ten ounces per square foot.

5. The flashing material according to claim 4 wherein the copper sheeting substrate is about two to seven ounces per square foot.

* * * * *